United States Patent
Shapira (10) Patent No.: US 7,313,407 B2
(45) Date of Patent: Dec. 25, 2007

(54) ALLOCATION OF RADIO RESOURCES IN A CDMA2000 CELLULAR SYSTEM

(76) Inventor: Aharon Shapira, 27 Kaufman St., Haifa 34780 (IL)

( * ) Notice: Subject to any disclaimer, the term of this patent is extended or adjusted under 35 U.S.C. 154(b) by 890 days.

(21) Appl. No.: 10/654,419

(22) Filed: Sep. 4, 2003

(65) Prior Publication Data

US 2004/0048630 A1    Mar. 11, 2004

(30) Foreign Application Priority Data

Sep. 5, 2002    (IL)    ..................... 151644

(51) Int. Cl.
  *H04Q 7/20*    (2006.01)
  *H04Q 7/28*    (2006.01)
  *H04Q 7/00*    (2006.01)
  *H04M 1/00*    (2006.01)

(52) U.S. Cl. .............. 455/512; 455/452.1; 455/509; 455/513; 455/425; 455/550.1; 370/329; 370/341

(58) Field of Classification Search ............... 370/395.61–395.65, 229–235, 253, 333, 370/328–338, 431, 493–495, 537–546, 340–341; 455/183.2, 127.5, 127.2, 127.1, 574, 560–561, 455/452.1–452.2, 13.4, 403, 418–421, 434, 455/453, 450–451, 455, 463, 507–517, 63.2, 455/522–526, 570, 67.11, 67.13, 550.1, 556.2, 455/45, 422.1, 424–425, 435.3, 464, 500; 709/206–207

See application file for complete search history.

(56) References Cited

U.S. PATENT DOCUMENTS

| | | | |
|---|---|---|---|
| 6,272,124 B1 * | 8/2001 | Ahn et al. .................. | 370/342 |
| 6,285,886 B1 * | 9/2001 | Kamel et al. ................ | 455/522 |
| 6,335,922 B1 | 1/2002 | Tiedemann, Jr. et al. | |
| 6,400,699 B1 | 6/2002 | Airy et al. | |
| 6,574,211 B2 | 6/2003 | Padovani et al. | |
| 6,614,777 B2 | 9/2003 | Menzel et al. | |
| 6,775,541 B2 * | 8/2004 | Dillon et al. ............ | 455/422.1 |
| 6,795,411 B1 * | 9/2004 | Dino et al. ................. | 370/329 |
| 6,847,629 B2 | 1/2005 | Razoumov et al. | |
| 6,850,499 B2 | 2/2005 | Wheatley, III et al. | |
| 6,920,119 B2 * | 7/2005 | Rinchiuso ................... | 370/329 |
| 6,925,057 B2 | 8/2005 | Cheng et al. | |
| 7,046,066 B2 * | 5/2006 | Saado et al. ................ | 327/291 |
| 2001/0008520 A1 * | 7/2001 | Tiedemann et al. ......... | 370/328 |
| 2003/0152051 A1 * | 8/2003 | Odenwalder ................ | 370/332 |

FOREIGN PATENT DOCUMENTS

EP    1077534 A1    2/2001

* cited by examiner

Primary Examiner—Meless Zewdu (57) ABSTRACT

A CDMA data transmission system and method for periodically allocating channels to subscriber units, wherein prior to the beginning of any period all active subscriber units are identified that are in communication with the transmitter and for which there are data, exceeding a given minimal quantity, stored in a buffer. For each active subscriber unit one or more priority factors are calculated as a function of associated power levels; and on the basis of the priority factors, at least one channel is allocated to a corresponding active subscriber unit. The channel allocation is repeated in respect of any active subscriber units to which no channels have yet been allocated, subject to an availability of unallocated channels and subject to a limitation of maximum transmitter power.

30 Claims, 5 Drawing Sheets

FIG. 1

| SU\Channel | 1x (k=0) | 2x (k=1) | 4x (k=2) | 8x (k=3) | 16x (k=4) |
|---|---|---|---|---|---|
| 0 | $P_{0,0}$ | $P_{0,1}$ | $P_{0,2}$ | $P_{0,3}$ | $P_{0,4}$ |
| 1 | $P_{1,0}$ | $P_{1,1}$ | $P_{1,2}$ | $P_{1,3}$ | $P_{1,4}$ |
| 2 | $P_{2,0}$ |  | $P_{2,2}$ |  |  |
|  |  |  |  |  |  |
| j | $P_{j,0}$ | $P_{j,1}$ |  | $P_{j,3}$ |  |
|  |  |  |  |  |  |
| M | $P_{M,0}$ |  |  |  | $P_{M,4}$ |

$PF_{j,k}$ – Priority Factor of the user j if allocated channel rate level k.

J = 0 ..... M (users)
k = 0, 1, 2, 3, 4 (channel rate level)

ALLOCATION OF RADIO RESOURCES IN A CDMA2000 CELLULAR SYSTEM

FIELD OF THE INVENTION

This invention relates to data transmission in a CDMA cellular telephone system and in particular—to allocation of transmission resources of a transmitter among connected subscribers.

BACKGROUND OF THE INVENTION

Cellular telephone systems are increasingly used for transmission of data from various sources to subscribers. The data are usually requested by a subscriber and are usually transmitted to the cellular system from appropriate sources over the Internet, then transmitted through the core network and a radio access network (RAN) of the cellular system to the base station, with which the subscriber unit is connected, and finally radio-transmitted from the base station to the subscriber unit. In conformance with the Internet Protocol (IP), all data are transmitted asynchronously as packets. Data arriving at the base station are accumulated in buffer storage, where a storage bin is designated to each actively connected subscriber unit. The present invention is concerned with the final lag of transmission, namely from a buffer storage bin, over the base station's radio transmitter, to the subscriber's receiver.

Cellular data transmission differs from cellular voice transmission in several aspects: (a) The required rate of transmission, in the case of data, varies greatly with time, as well as among subscriber units, while for voice it remains constant. (b) Moreover, the maximum required rate, for data, may exceed that for voice by orders of magnitude. (c) Unlike voice, data need not, generally, be transmitted continuously, but may be transmitted in bursts (i.e. many packets in close succession), with considerable intervals between them; however certain types of data applications (notably streaming types) have different tolerances to lengths of intervals. (d) Various subscribers may be given different degrees of quality of service (QoS)—for example, in terms of guaranteed minimum transmission rate. In order to accommodate these characteristics, new operating standards are being introduced to cellular systems. In particular, systems using the Code Division Multiple Access (CDMA) mode of transmission, have a new standard, known as CDMA 2000.

Figure 1:
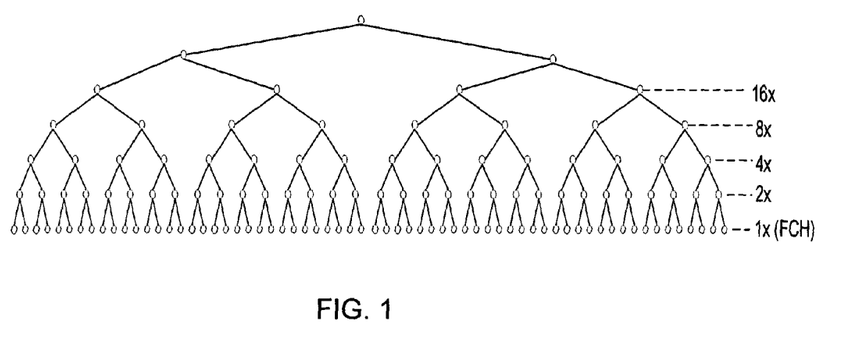
FIG. 1 is a schematic diagram depicting the hierarchical structure of channels at various rate levels in a cellular data transmission system with CDMA 2000 standard.

As is known, a channel in a CDMA system is defined by a particular code out of a set of N mutually orthogonal codes, known as a Walsh set. According to the CDMA 2000 standard there are defined, for any one radio transmission facility (e.g. a radio carrier), a set of $N=2^n$ fundamental channels, in terms of N Walsh codes, where N is typically 64 (n=6). Typically, a fundamental channel (FCH, also known as 1x channel, which is similar to a regular voice channel) carries data at a rate of about 10 Kbits per second. By defining suitable common subsets of the codes, fundamental channels are combinable, in a hierarchical manner into higher-rate (i.e. wider-bandwidth) channels as follows: A set of N/2 (e.g. 32) 2x channels, each carrying about 20 Kbits per second; a set of N/4 (e.g. 16) 4x channels, each carrying about 40 Kbits per second; and so on. The levels are also designated by a parameter k, whose value is 0 for the lowest level (i.e. for FCH), 1 for the second level, 2 for the third level and so on. The transmission rate (TR) at any level is then simply that of the lowest level (e.g. 10 Kb/s) multiplied by $2^k$. The corresponding Walsh codes are designed as a hierarchical binary structure, illustrated in FIG. 1, wherein, at each level, a code is a subset of certain two codes at the next lower level. Thus, for example, a 4x code is a subset of four related fundamental channel codes (two levels lower). The relationship between channels at the various levels, as determined by the code structure, is sometimes expressed in genealogical terms, such as "father", "brother", "son", "grandson", etc. When any particular wide channel is used, all related channels at the lower levels (i.e. all the "offsprings"), as well as all the directly related channels at the higher levels (i.e. all the "ancestors" in direct lineage) are not available; it is noted, though, that other related channels (such as "brothers" and "uncles" and their offsprings) are available, if not otherwise allocated. At any time, any available channel at any level may be allocable to any active subscriber unit, subject to the hierarchy discussed above and to certain constraints discussed below.

In common with other cellular systems, in a system operating under the CDMA 2000 standard, the signal power transmitted to any subscriber unit (SU) is a function of the transmission conditions (which depend, inter alia, on the distance between the subscriber unit and the base station), whereby the power is adjusted to maintain a given received signal-to-noise ratio. The signal-to-noise ratio is, however, also a function of the channel bandwidth and thus of the rate level of the channel; the higher the rate, and thus the wider the band, the higher the noise level and thus the higher the required transmission power. It is also noted that the total power of all signals transmitted at any instant is subject to a maximum value, characteristic of the transmitter.

Periodically channels must be allocated to subscriber units in order to carry to them data, addressed to them that have accumulated in the buffer storage. The duration of the period is in the order of a few hundred milliseconds. According to current practice, allocation is carried out, by a so-called scheduling engine, near the beginning of each period typically as follows: A storage bin is selected at random and the amount of data accumulated therein is compared with a series of threshold values; according to the outcome, a commensurate transmission rate, if any, is determined. If a channel of that rate is available, it is allocated to the subscriber unit corresponding to the bin, provided that the power required to transmit it to the subscriber unit does not cause the total power to exceed the maximum. Failing this, a channel of half the determined rate, if available, is allocated to that subscriber unit, again subject to the power test; and so on. Next, another bin is randomly chosen and the same process is followed. This cycle is repeated until there are no channels left or until any allocation would cause the maximum available power to be exceeded or until there is no data waiting in storage. Variations of this procedure are also in common practice.

Allocation procedures in present practice, as outlined above, do not optimally utilize the limited transmission resources, which are the overall data rate capacity and the maximum overall power. In particular, they allow spending an inappropriately large portion of the power on high rate transmission to subscriber units having poor radio reception; they also cause transmission rates to be dependent solely on buffered data sizes, which by themselves are random, and possibly on random selection. Moreover, procedures in present practice do not generally include QoS considerations and also cannot be geared to any business policy, such as would control transmission so as to maximize some variable (which may, for example, be overall transmission rate or overall revenue).

SUMMARY OF THE INVENTION

The present invention is of a method, and an apparatus to carry out the method, to allocate transmission resources of a cellular transmitter among active subscriber units (SUs) in communication therewith, for which there is data stored in an associated buffer storage, the allocation being so as to attempt to maximize one or more given variables according to any defined business policy. As discussed above in the Background section, the given variable may be overall transmission rate (throughput) or overall revenue (according to some billing model) or adherence to one or more promised QoS attributes, such as average rate QoS. The basic idea of the method is to calculate, prior to the beginning of each period, one or more priority factors for each active subscriber unit and to allocate channels according to the priority factors, commencing with the one having highest value. The calculation formula operates on the given variable and on the level of power required in each case; in general, the priority factor is inversely related to the required power. The allocation procedure also considers all the relevant operational constraints, such as minimum and maximum amounts of stored data per subscriber unit, the hierarchical structure of the channels and the maximum overall power, as well as constraints dictated by the standard, by fairness considerations and by service agreements. The latter may include components such as a minimum average rate to each subscriber unit or a maximum delay between data packages.

In the Detailed Description below are explained exemplary algorithms to implement the method of the invention, for three specific business policies; the choice of the particular business policies is also itself exemplary, intended to illustrate the principles of the invention. These algorithms are summarized below, but neither they nor the choice of the particular business policies addressed by them should be construed as limiting the scope of the invention.

A business policy implemented in the first exemplary algorithm is one that aims simply at maximizing throughput, i.e. making the total amount of data transmitted over any period of time as large as possible. To implement this policy, priority factors are calculated for each active subscriber unit and for every possible level of transmission rate (i.e. channel bandwidth). The rate level is constrained by the availability of channels and, for each subscriber unit, by the current queue size (i.e. the amount of data waiting in the respective buffer bin). Each priority factor (PF) is calculated as the ratio of some function of the respective bit rate to the power required for transmission to the subscriber unit over a fundamental channel. Allocation for any period is carried out in a recursive procedure, whereby first all possible priority factors are calculated and the one with the highest value selected; the corresponding subscriber unit is assigned a channel at the corresponding rate level, if consistent with constraints imposed by available system resources; the system resources are then reevaluated and the cycle is repeated with the next highest priority factor.

A business policy implemented in the second exemplary algorithm is one that aims at maximizing throughput while assuring a minimal average data rate during any one call. This policy is implemented as follows: For each active subscriber unit, a discrepancy factor is calculated, as the ratio of the promised rate to the average rate of actual transmission since the beginning of the call, and then a priority factor is calculated, as the ratio of a function of the discrepancy factor to the power required for transmission to the subscriber unit over a fundamental channel. Allocation for any period is, again, carried out in a recursive procedure, whereby first all possible priority factors are calculated and the one with the highest value selected; the corresponding subscriber unit is assigned a channel at the highest possible rate level, if consistent with constraints imposed by available system resources; the system resources are then reevaluated and the cycle is repeated.

A business policy implemented in the third exemplary algorithm is one that aims at maximizing revenue. Such a policy must be based on a selectable billing model. Typically a billing model is a formula that relates the charge for a call to the amount of data transmitted and to the QoS (e.g. average rate of transmission). As in the implementation of the first policy, discussed above, the periodic allocation procedure is recursive, whereby at each cycle, a priority factor is calculated for each as yet unallocated subscriber unit and for every possible rate level (under the same constraints) and the highest priority factor indicates the next subscriber unit and the rate level of the channel to be allocable to it. However, in this case each priority factor is calculated as follows: First an incremental revenue of the respective subscriber unit is calculated as the revenue to be generated by transmission to the subscriber unit at the respective rate over the coming time period; the calculation is based on the billing model. Next, a net revenue gain (NRG) is calculated, as the difference between the respective incremental revenue and the loss in revenue that would be incurred by all other subscriber units that are not allocated a channel. Finally, the priority factor is calculated as the ratio of the respective net revenue gain to the respective required power.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 2:
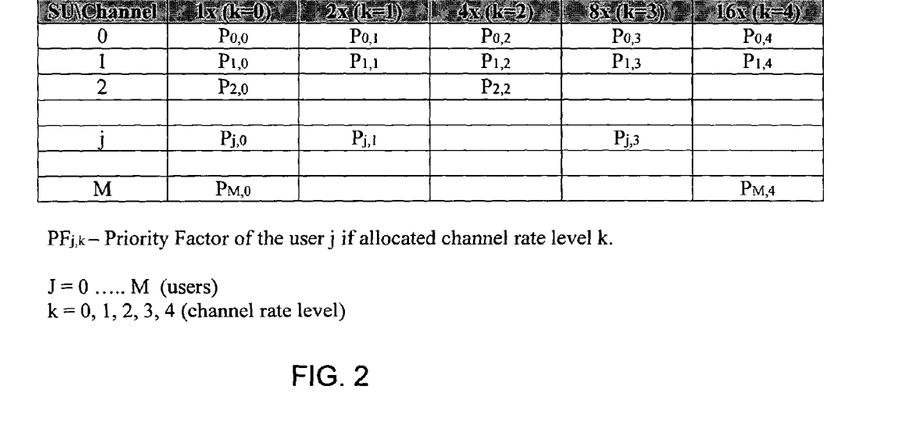
FIG. 2 depicts a table of priority factors, used in some of the embodiments of the invention.

FIG. 2 shows a two-dimensional table, in which rows correspond to active subscriber units and columns—to the various channel rate designations (e.g. 1x, 2x, 4x, etc.). The entries in the table are priority factor values, denoted in the figure by "PF" with the row- and column indices; thus $PF_{j,k}$ is the value of the priority factor for subscriber unit j when receiving data over a channel of rate level k. The priority factors are calculated and used in ways specific to the various embodiments, explained below. It is noted that, in general, a priority factor is calculated as the ratio of some specific variable to a power-related variable. The latter is generally some monotonically increasing function of the power required to transmit data to the respective subscriber unit at some given signal-to-noise ratio and some given rate level; usually the rate level for this calculation is the lowest, i.e. that of a fundamental channel, and the function is preferably linear (or simply an identity). The reason for the power-related variable being in the denominator of the priority factor formula is that allocating a channel to a subscriber unit with relatively high power requirement is wasteful of the limited power resource of the transmitter.

A first embodiment of the method of the invention is directed to allocating channels according to a business policy that seeks to maximize throughput, i.e. the average overall rate of data flow to subscriber units. Equation (1) shows the formula for calculating the priority factor under this policy.

$$PF_{j,k} = \frac{(TR_{FCH}) \cdot 2^k}{P_j^m} \quad (1)$$

where:

$PF_{j,k}$=Priority factor of subscribers at rate level k $TR_{FCH}$=Transmission rate of a fundamental channel (FCH) (say 10 kb/s)

$P_j$=Power required for transmitting fundamental channel to subscriber j m=constant.

The specific variable in the numerator of the formula is simply equal to the transmission rate (TR) over the respective channel, i.e. that of the corresponding rate level (appearing as column heads in the table of FIG. 2). For example, for a fundamental (1x or FCH) level (k=0) the rate is 10 Kbits/sec., for a 2x level (k=1)–20 Kbits/sec., for a 4x level (k=2)–40 Kbits/sec., etc.; the numerator may also be any variable proportional to the transmission rate. As explained above for the general case, the denominator consists of P raised to some power m, where P is equal or proportional to the power required to transmit data to the respective subscriber unit over, say, a 1x channel (FCH).

Figure 3:
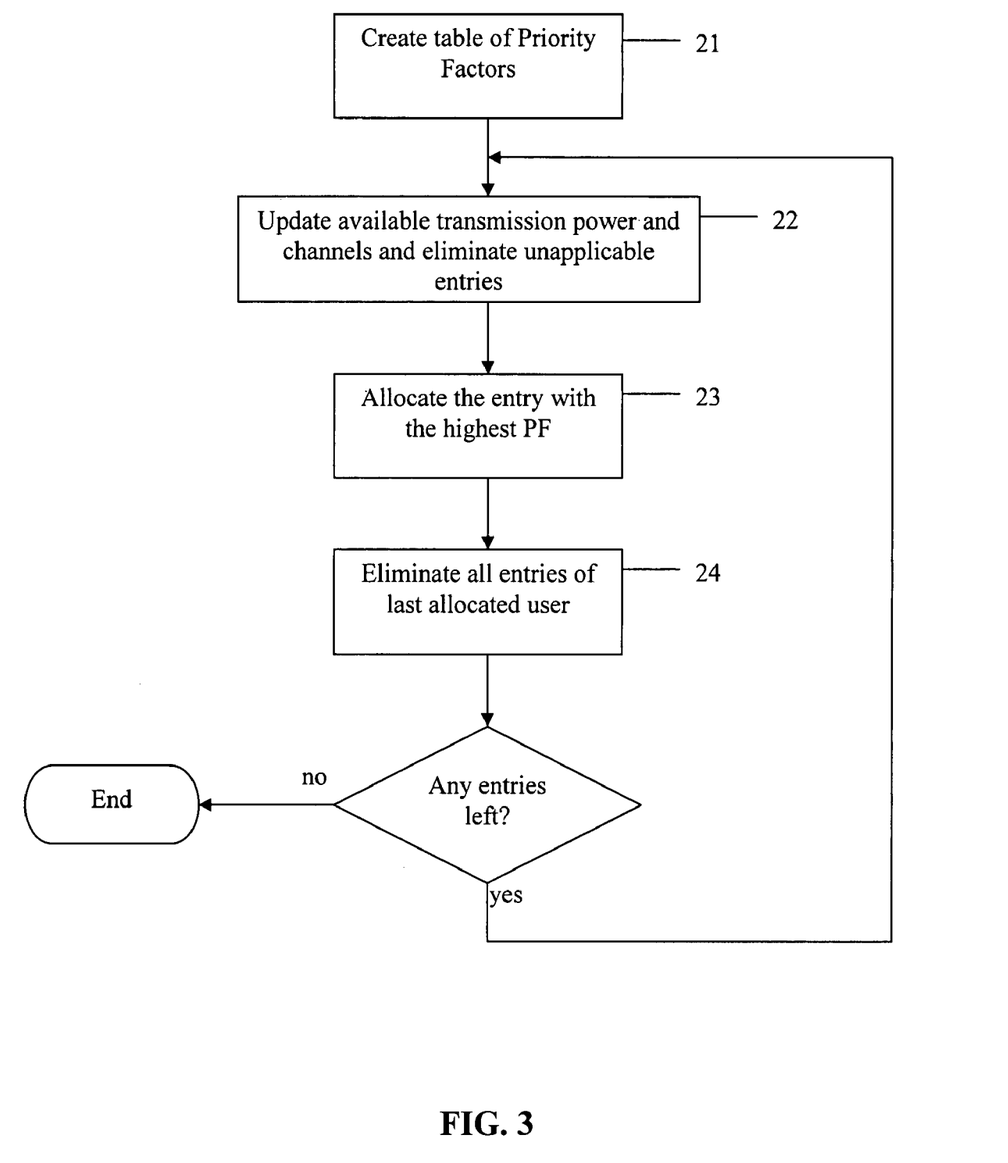
FIG. 3 is a flow diagram showing the principal operations required for channel allocation according to a first embodiment of the invention.

FIG. 3 is a flow diagram showing the principal operations carried out by the allocation procedure according to a first embodiment of the invention. The procedure, which is iterative, is executed prior to the beginning of each period (of, say, 200 milliseconds) and its outcome is the allocation of channels to subscriber units for transmission over that period. During the procedure, a list of available channels, initially obtained, for example, from a Walsh codes manager (see FIG. 6), is maintained and updated upon each allocation iteration. The list is subject to the hierarchical structure of the rate levels, as in FIG. 1; this means that allocation of a particular channel at a certain rate level eliminates from the list not only that channel, but also all corresponding channels at the lower levels (i.e. those directly or indirectly branching from it), as well as corresponding channels at all the higher levels (i.e. those from which it directly or indirectly branches). For example, with reference to FIG. 1, if the channel represented by the rightmost circle at level 4x (k=2) were allocated, then also the channels represented by the rightmost two circles at level 2x (k=1), as well by the rightmost four circles at level 1x (k=0), would become unavailable; additionally, the channels represented by the rightmost circle at each of levels 8x (k=3), 16x (k=4) and 32x (k=5), as well as the channel at the top level (k=6), would become unavailable.

First (21), priority factors are compiled, in a table such as in FIG. 2, for active subscriber units (in rows) and for relevant rate levels (in columns). Of the subscriber units, there are listed only those for which there are data waiting in the buffer storage. For each listed subscriber unit, priority factors are calculated, according to Equation (1), for every rate level up to a maximum level. The maximum level is determined as that which does not exceed the lower of (a) the amount of respective data in the buffer, divided by the duration of a period; and (b) the maximum rate currently available. It should be noted that the currently available maximum rate is identical for all subscriber units and is determined by scanning the available channels register; initially, it is that of the highest level in the system (e.g. 16x). All entries whose required power exceeds the available power are eliminated from further consideration (22).

All priority factors in the table are then compared with each other (23) and the one with the highest value is selected. The respective subscriber unit is then allocated a channel at the respective rate level and is eliminated from the table (24). If there still remain listed other subscriber units, the table is updated (22) as follows: (a) The available channels register is updated, a new maximum available rate level is determined accordingly and entries in all columns of the table above that rate level are eliminated; (b) the remaining available power is calculated, as that which was previously available (which is maximum power during the first iteration) minus that required for the transmission just allocated, and all entries for which the required power would exceed the available power are eliminated.

The remaining entries are again compared (23) and the process is cyclically iterated until there are no entries left in the table. This will normally occur when there are no available channels left or when the maximum available power level has been reached or when there are no data left in the buffer storage. At this point the allocation information is fed to the transmitter and transmission of data to the selected subscriber units over the allocated channels may proceed over the ensuing period. Toward the end of that period a similar allocation procedure is initiated and the whole process repeats as required.

A second configuration of the method of the invention is directed to allocating channels according to a business policy that seeks to maximize throughput while maintaining promised minimum average rates. A minimum average rate is a value that may be promised to a subscriber, usually as part of a service level agreement (SLA). In this configuration the table of priority factors has a single column and a priority factor is calculated for each active subscriber unit, using Equation (2):

$$PF_j = \frac{(TR_{promised} / TR_{average})_j}{P_j^m} \quad (2)$$

where:

$PF_j$=Priority factor of subscriber j $TR_{promised}$=Transmission rate promised to subscriber j $TR_{average}$=Average transmission rate to subscriber j since beginning of message m=constant It will be seen that Equation (2) is similar to Equation (1) except for the numerator, calculated as follows: The amount of data transmitted to each subscriber unit, as well as the time elapsed, from the beginning of the respective current data transfer process, are continuously accumulated and their ratio is calculated, to become the average data rate. The specific variable in the numerator of the priority factor formula is calculated as the ratio of the promised minimum rate to the last calculated average data rate. The specific variable is thus a measure of the discrepancy between the actual average rate received by a subscriber unit and the rate promised thereto. As before, this variable is divided by P, the required transmission power at the lowest rate level (1x or FCH), with exponent (i.e. raised to some power) m.

Figure 4:
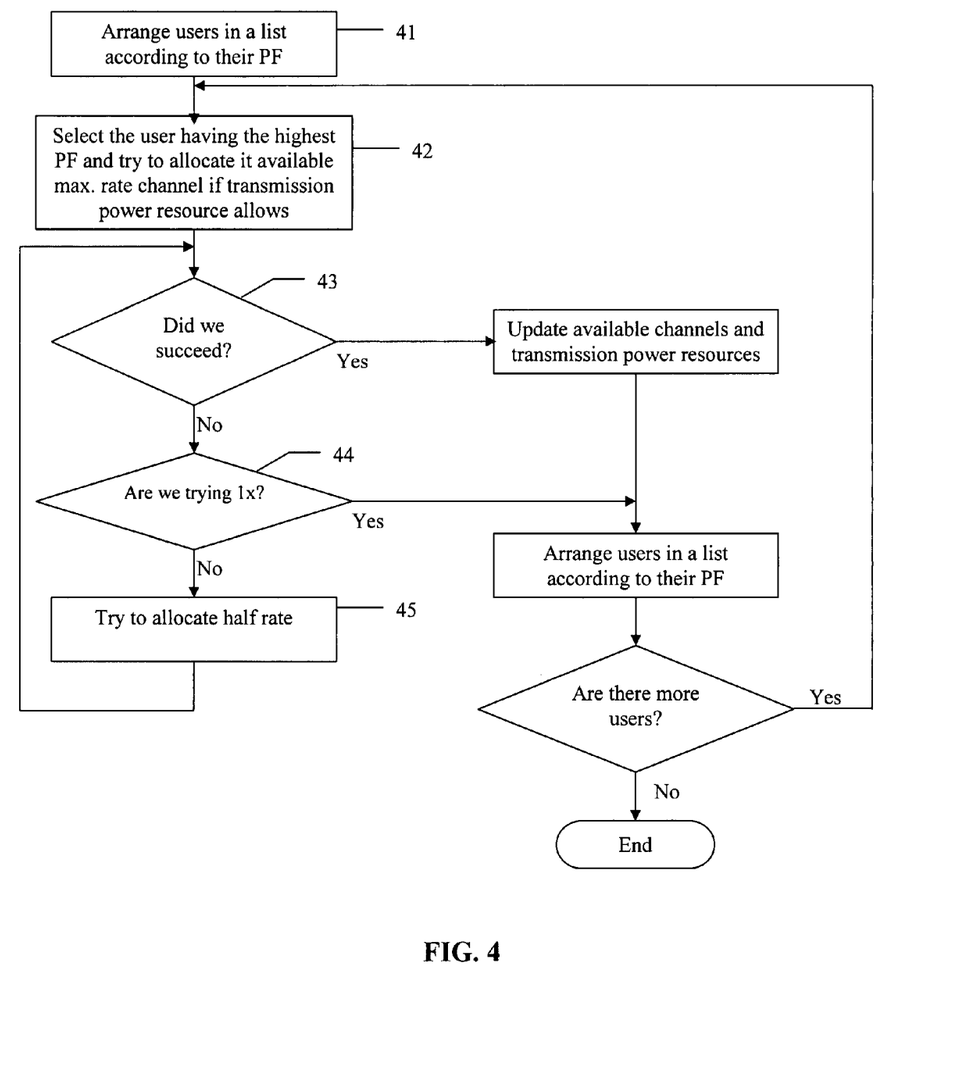
FIG. 4 is a flow diagram showing the principal operations required for channel allocation according to a second embodiment of the invention.

FIG. 4 is a flow diagram showing the principal operations carried out by the allocation procedure according to a second embodiment of the invention. After calculating a table of priority factors (41), as explained above, the procedure is, again, iterative and, in general, similar to the procedure of the first configuration, except as follows: The subscriber unit with the highest priority factor value is selected (42) and an attempt is made to allocate a channel to it; the chosen channel is of the highest rate level available, provided that the corresponding required power does not exceed the available transmitter power (after accounting for previously allocated channels and subscriber units—which are null at the first iteration). If (43) the power test fails, and if (44) the attempted rate is still wider than 1x, an attempt is made (45) to allocate a channel at a just lower rate level. The power test is then repeated (43) and the loop iterated until either the power test is satisfied, in which case the subscriber unit is allocated a channel at the last attempted rate level and (4-6) the list of available channels and the available power are updated, as in the first configuration, or (44) the attempted allocation is of a fundamental channel (1x) and fails the power test. In either case, the respective subscriber unit is eliminated from further consideration. As before, the procedure is iterated as long as (4-8) there are unallocated subscriber units in the table or the transmitter resources (power or channels) are exhausted.

A third configuration of the method of the invention is directed to allocating channels according to a business policy that seeks to maximize total revenue. It is similar to the first configuration, differing from it mainly in the calculation of the priority factors. Two formulas, shown as Equations (3) and (4) serve for this calculation. The first formula, shown in Equation (3), for calculating revenue, expresses a revenue function that reflects a billing model, that is—the manner of charging a subscriber for data transmission.

$$R_{j,t}=B_{j,t}[C_0+a.\ \log(1+b.(TR_{average})_{j,t})] \quad (3)$$

where:

$R_{j,t}$=Revenue accumulated from subscriber j at a time t (since call initiation)

$B_{j,t}$=Total number of bits received by subscriber j at a time t (since call initiation)

$(TR_{average})_{j,t}$=Average transmission rate to subscriber j until time t (since call initiation)

$C_{0,\ a,\ b}$=constants

The method of this invention, in general, and the third embodiment, in particular, contemplates any billing model. The formula in Equation (3) is exemplary and expresses the revenue function of a possible billing model; any other model and corresponding function and formula could be equally used. The revenue function of Equation (3) includes a component that is related to the amount of data transmitted and a component that is related to the average rate of transmission. The second component represents a premium for fast rates, which is one of the attributes of quality of service (QoS). Other attributes of QoS that may be considered in a billing model are average delay, average jitter and reliability (the latter being a function of signal-to-noise ratio and hence of transmitted signal power). Inclusion of particular QoS attributes in the billing model may be determined as part of the service level agreement (SLA), differentially for each subscriber unit. Moreover, the attributes may be applied for any subscriber unit differentially as a function of the indicated application for (or type of) the data.

It will be appreciated that while the invention is described with reference to a specific revenue function and corresponding billing calculation, as well as specific data collection for billing, these are exemplary and the invention contemplates use of any billing model and a corresponding revenue function in the channel allocation procedure. The exemplary revenue formula shown in Equation (3) stipulates that the revenue be proportional to the amount of data transmitted and to a logarithmic function of the average rate of transmission. The latter variable is determined in a manner similar to that in the second embodiment, as explained above.

Equation (4) shows a formula for calculating priority factors as function of anticipated revenue.

$$PF_{j,k} = \frac{(NRG)_{j,k}}{P_{j,k}^m} \quad (4)$$

where:

$(NRG)_{j,k}$=Net Revenue Gain when transmitting to user j a channel of rate k $P_{j,k}$=Power required for transmitting a channel of rate k to a user j m=constant The specific variable in the numerator of Equation (4) is the net revenue gain (NRG) for the corresponding subscriber unit and the corresponding rate level. This variable, NRG, is calculated, on the basis of any billing model, such as that expressed by equation (3) for example, as follows: First, a "revenue gain" is calculated, as the revenue that would be generated by sending data to the subscriber unit at the indicated channel rate level over the coming period; this is done by using the revenue formula twice—first for the revenue generated by the subscriber unit from the beginning of the current data transfer up to the present, then—for that generated up to the end of the coming period (whereby the value of the average transmitted rate is updated) and by taking the difference between the two results. Next, a "loss of alternative revenue" is calculated by applying a differential calculation, similar to the above, to each of the other subscriber units, but assuming that no data will be transmitted during the coming period. It is to be noted that the result will usually be negative, due to the reduction in the average rate value. Finally the "loss of alternative revenue" values of all other subscriber units (which, as noted, are usually negative) are added to the "revenue gain" of the candidate entry, to obtain the net revenue gain, NRG. The latter is then divided by a function (e.g. power m) of the respective required transmitting power (similarly to the previously described embodiments), to obtain the corresponding priority factor.

Figure 5:
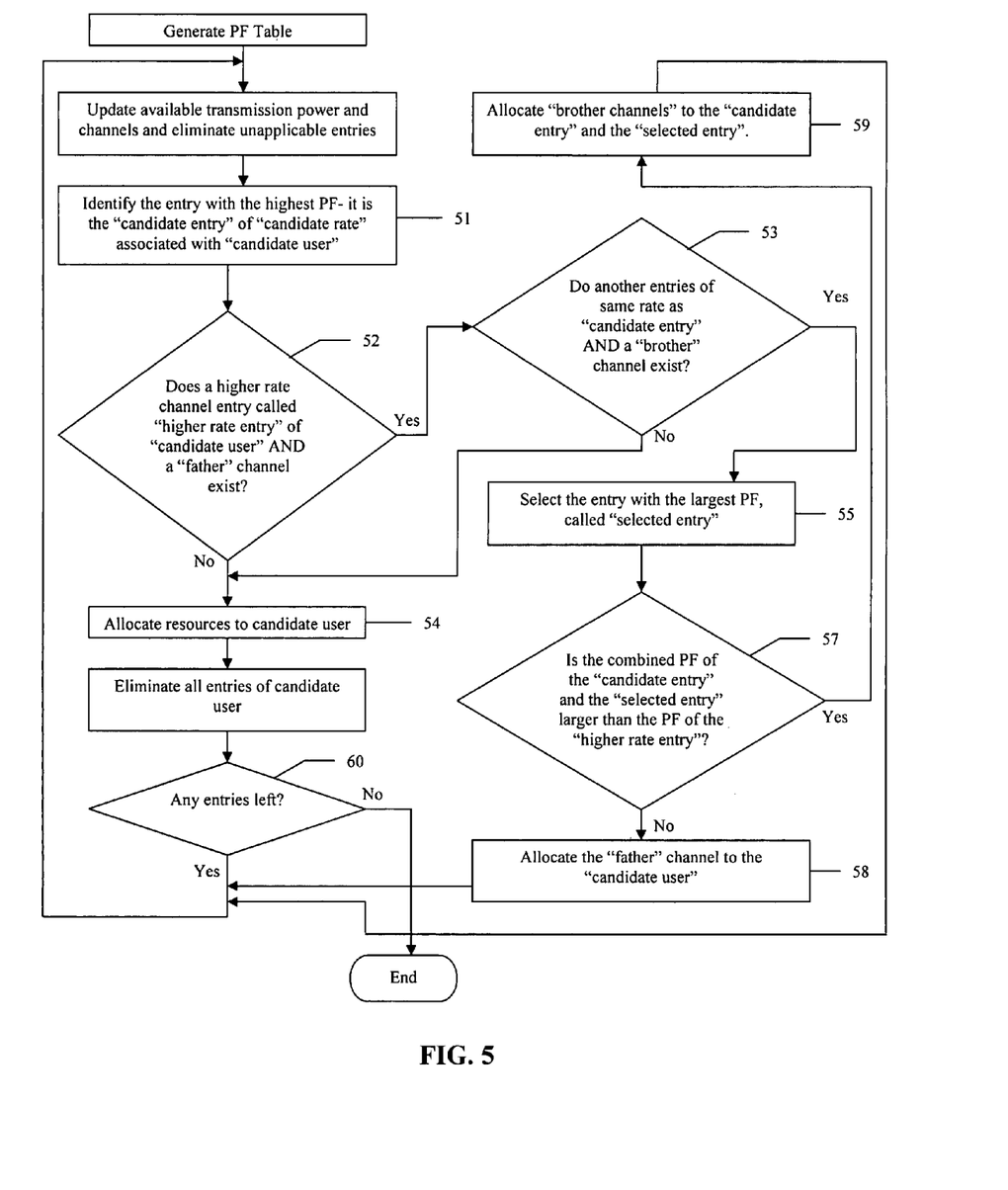
FIG. 5 is a flow diagram showing the principal operations required for channel allocation according to a third embodiment of the invention.

The allocation procedure in this embodiment may be according to any one of two preferred algorithms. The first algorithm is generally similar to that of the first configuration, as illustrated by the flow chart of FIG. 3 and as described above. The second algorithm is illustrated by the flow chart of FIG. 5; it is, again, basically similar to the first algorithm, except as follows: After selecting (51) from the priority factor table the entry with the highest value (which entry, to be termed "candidate entry", is associated with a certain "candidate subscriber unit" and a certain "candidate rate level"), the table is checked (52) whether there exists for the candidate subscriber unit an entry at a level just one higher than the candidate rate level, and whether a father channel is available; if both these conditions are met, the table is further checked (53) as to whether a brother channel to the candidate channel is available and whether there exists at least one other entry at the candidate level. If not all of these conditions are met, the candidate subscriber unit is allocated a channel at the candidate level (54) and the cycle is repeated as in the other algorithms; otherwise, allocation is made as follows: The priority factors of all the other entries at the candidate level (if more than one) are compared (55) and the highest one (associated with a "candidate brother subscriber unit") is added (56) to the priority factor of the candidate entry, to obtain a combined priority factor. The combined priority factor is then compared (57) with the priority factor of the higher-level entry; if the latter is larger, the candidate subscriber unit is allocated (58) the higher-level channel; otherwise, both the candidate subscriber unit and the candidate brother subscriber unit are allocated (59) respective brother channels at the candidate level. The cycle is then repeated as in the other algorithms, until there are no relevant entries left in the table (60).

Figure 6:
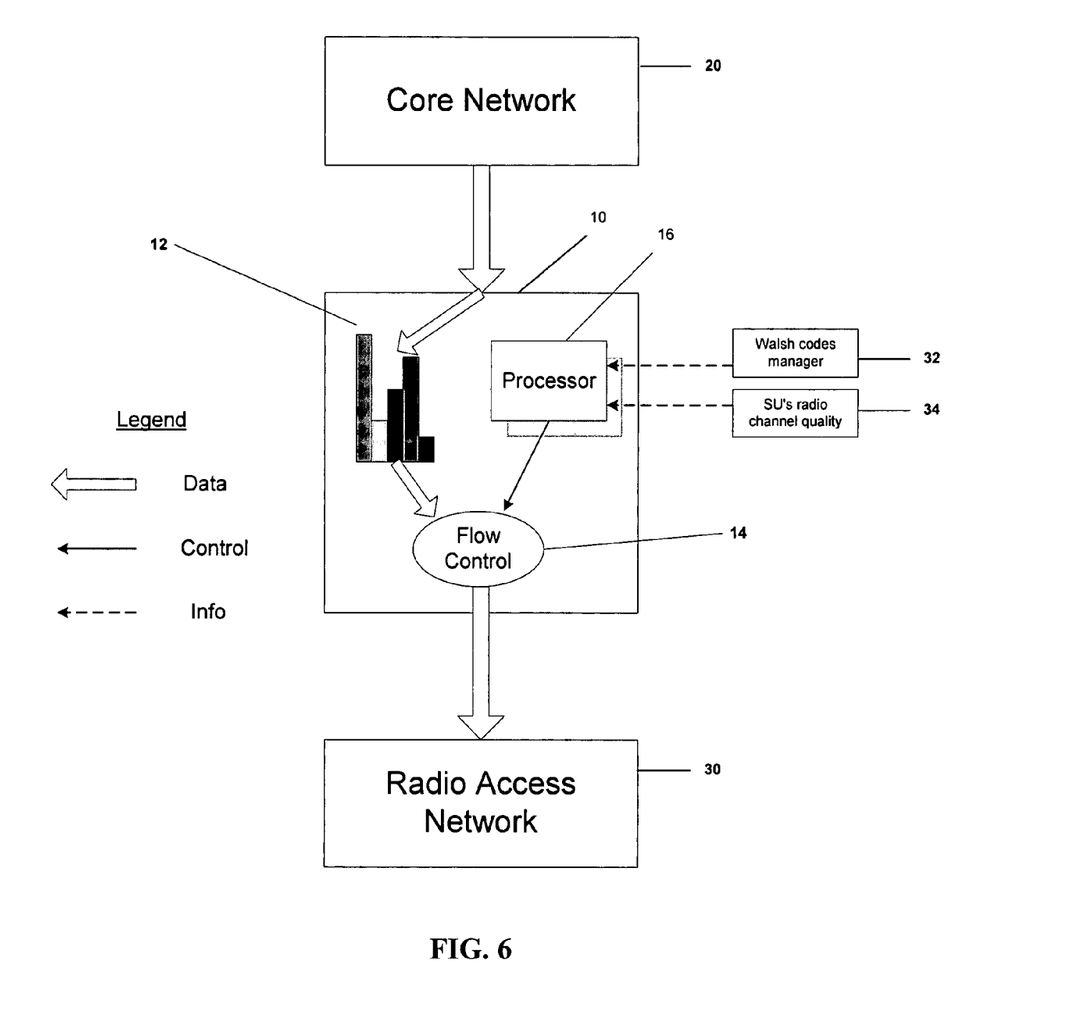
FIG. 6 is a schematic block diagram illustrating apparatus to carry out the methods of the invention.

FIG. 6 depicts schematically a preferred apparatus for carrying out the method according to the invention. The apparatus comprises a scheduler 10, that preferably resides on the premises of a corresponding Radio Access Network 30 (see below). Scheduler 10 includes an Allocator 16, a buffer storage 12 and a flow controller 14. Allocator 16 consists of a suitably programmed digital processor, which is designed to operate in real time, that is—to carry out the computations required for allocating all available channels within a time duration that is considerably shorter than a period (in the cycle of allocation and transmission). Traffic data intended for active subscriber units is received from a core network 20 in the cellular system and stored in buffer storage 12—in FIFO bins corresponding to the subscriber units. Information about stored quantities in the storage bins is fed to Allocator 16. The allocator also receives, from a Walsh Codes Manager 32, information about the availability of the Walsh codes (i.e. the available channels at the various rate levels) and, from a Radio Channel Quality Indicator 34, information about the radio reception quality (hence—the required power) for the various active subscriber units. Both Walsh Codes Manager 32 and Radio Channel Quality Indicator 34 are part of the cellular system. Allocator 16 has stored within it a computer program to carry out the calculations and procedures, according to any embodiment of the method of the invention, as described above, as well as all relevant constants and parameters, including those related to business policies. The latter may also be fed to the Allocator from some management module within the cellular system.

Allocator 16 periodically carries out channel allocation, according to any of the above-described methods of the invention, and feeds the results to Flow Control Module 14. The Flow Control Module 14, which may be a suitably programmed digital processor, accordingly retrieves appropriate amounts of data from relevant bins in the buffer storage 12 and sends them, together with the corresponding channel identities, to Radio Access Network 30 (which is part of the cellular system), to be radio transmitted.

The apparatus of FIG. 6 may be realized as an add-on module, to be connected to a cellular system, or as an inherent module that is integrated with the cellular system. Embodiments other than that of FIG. 6 are also possible within the scope of the invention. In particular, the scheduler, as a whole, or any of its components, such as the allocator, the buffer storage and the flow controller, can be realized within, or as part of, equipment within the cellular system that carries out channel allocation and flow control also by other methods or serves for other functions within the cellular system. It is only essential that one or more digital processors be programmed to carry out the functions of channel allocation and data flow control according to any of the methods of the invention.

Although the apparatus and the method of the invention have been described in terms of channels allocation for one transmitter (with respect to subscriber units in communication with it), it will be understood that the method is obviously also applicable, and any one apparatus may be operative, to simultaneously allocate channels for a plurality of transmitters. In particular, the apparatus, preferably being logically and physically associated with a Radio Access Network (RAN), is preferably operative to allocate channels for each of the transmitters served by the RAN.

Furthermore, although the method and apparatus of the invention have been described above in terms of a cellular telephone transmission system, it will be understood that they are also applicable to other transmission systems having data transmission characteristics such as addressed above. It will also be understood that any processor in apparatus according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention. It will further be understood that other configurations and embodiments of the method and apparatus of the invention are possible, all coming within the scope of the invention.

In the method claims that follow, alphabetic characters and Roman numerals used to designate different operations are provided for convenience only and do not imply any particular order of performing the operations.

The invention claimed is:

1. In a data transmission system for transmitting data from a transmitter to a plurality of subscriber units, wherein: fundamental channels (FCHs) are combined, in a hierarchical manner, into transmission channels of higher levels, each configured to carry data at a corresponding rate level, which is a correspondingly higher rate than the fundamental rate; and any unused channel, at any level, is periodically allocated to a corresponding one of the subscriber units, in order to carry data to the subscriber unit from a buffer storage during a subsequent period;

a method for periodically allocating channels to subscriber units, comprising, prior to the beginning of any period:

(a) identifying all active subscriber units being in communication with the transmitter and for which there are data, exceeding a given minimal quantity, stored in the buffer storage;

(b) calculating for each active subscriber unit one or more priority factors as a function of associated power levels;

(c) on the basis of said priority factors, allocating at least one channel, to a corresponding active subscriber unit;

(d) repeating the channel allocation with respect to any active subscriber units to which no channels have yet been allocated, subject to an availability of unallocated channels and subject to a limitation of maximum transmitter power.

2. The method of claim 1, wherein said priority factors are calculated also as a function of the rate levels of channels allocated to the respective subscriber units.

3. The method of claim 2, wherein there is defined for the system a revenue function, the method further comprising:

(e) based on the revenue function, calculating, for each active subscriber unit and for each rate level of channels allocated to it, a revenue value;

said priority factors being calculated also as a function of corresponding revenue values.

4. The method of claim 3, wherein said revenue function operates on at least one of the following variables: amount of data in current message that has been transmitted, average rate of transmission of current message.

5. The method of claim 3, further comprising selecting a highest one of said priority factors.

6. The method of claim 5, wherein the subscriber unit associated with said highest priority factor is a candidate subscriber unit and allocating channels includes checking whether a channel at a higher rate level than that corresponding to said highest priority factor is available and, if the priority factor that corresponds to the candidate subscriber unit and to said higher rate level satisfies a given criterion, allocating a channel at said higher rate level to the candidate subscriber unit.

7. The method of claim 5, wherein the subscriber unit associated with said highest priority factor is a candidate subscriber unit and allocating channels includes:

(i) checking whether two combinable channels at a rate level identical to that corresponding to said highest priority factor are available and whether any one or more other subscriber units, distinct from the candidate subscriber unit, have priority factors associated with said identical rate level, and (ii) if a priority factor corresponding to one of said other subscriber units satisfies a given criterion, allocating said two channels to the candidate subscriber unit and to said one other subscriber unit, respectively.

8. The method of claim 1, wherein the data for any subscriber unit are grouped as messages and there is a promised transmission rate (PTR) associated with each subscriber unit, the method further comprising:

(f) accumulating for each active subscriber unit the amount of data of a current message transmitted to it and calculating there from an average transmission rate; and wherein said priority factors are calculated also as a function of the PTR associated with the subscriber unit and of the average transmission rate for the subscriber unit.

9. The method of claim 1, wherein a ratio between the rates at any two rate levels is an integral power of 2.

10. The method of claim 1, wherein the data transmission system operates in CDMA mode and a channel is associated with a Walsh code.

11. The method of claim 1, wherein during each iteration, a single channel is allocated to the subscriber unit having a highest one of said priority factors.

12. The method of claim 1, wherein during each iteration, a channel is allocated to the subscriber unit having a highest one of said priority factors and at least one more channel is allocated to a corresponding associated subscriber unit.

13. Dynamic channel allocation apparatus for use with a data transmission system that transmits data from a transmitter to a plurality of subscriber units, the transmitter having a given maximum power level and a given number of fundamental transmission channels (FCHs), each FCH carrying data at a given fundamental rate; fundamental channels (FCHs) are combined, in a hierarchical manner, into transmission channels of higher levels, each configured to carry data at a corresponding rate level, which is a correspondingly higher rate than the fundamental rate; any unused channel, at any level, is periodically allocated to a corresponding one of the subscriber units, in order to carry data to the subscriber unit from a buffer storage during a subsequent period;

the apparatus comprising a digital processor that is programmed— to calculate for each active subscriber unit one or more priority factors as a function of associated power levels; and for each of a succession of periods, to allocate a channel to each of one or more active subscriber units, the allocation being based on said one or more priority factors.

14. The apparatus of claim 13, wherein said priority factors are calculated also as a function of the rate levels of channels allocated to the respective subscriber unit.

15. The apparatus of claim 14, wherein there is defined for the system a revenue function and wherein said processor is further programmed to calculate, for each active subscriber unit and for each rate level of channels allocated to it, a revenue value, based on the revenue function, and wherein said calculation of priority factors is also as a function of corresponding revenue values.

16. The apparatus of claim 13, wherein: the data for any subscriber unit are grouped as messages and there is a promised transmission rate (PTR) associated with each subscriber unit; said processor is further programmed to accumulate, for each active subscriber unit, the amount of data of a current message transmitted to it, to calculate there from an average transmission rate; and to calculate said priority factors also as a function of the PTR associated with the subscriber unit and of the average transmission rate for the subscriber unit.

17. The apparatus of claim 13, wherein a ratio between the rates at any two rate levels is an integral power of 2.

18. The apparatus of claim 13, wherein the data transmission system operates in CDMA mode and a channel is associated with a Walsh code.

19. The apparatus of claim 13, wherein any channel is allocated to the subscriber unit that corresponds to a highest one of said priority factors.

20. The apparatus of claim 13, wherein the transmission system is a cellular telephone system.

21. Dynamic channel allocation apparatus for use with a data transmission system that transmits data from a transmitter to a plurality of subscriber units, the transmitter having a given maximum power level and a given number of fundamental transmission channels (FCHs), each FCH carries data at a given fundamental rate; the FCHs being combined, in a hierarchical manner, into transmission channels of higher levels, each capable of carrying data at a corresponding rate level, which is a correspondingly higher rate than the fundamental rate; any unused channel, at any level, is periodically allocated to a corresponding one of the subscriber units, in order to carry to the subscriber unit, during a subsequent period, data provided therefor through the system; a power level being associated with each subscriber unit and with each rate level;

the apparatus comprising: a buffer storage, operative to store the data provided from the system in bins that correspond to subscriber units;

an allocator, which includes a digital processor that is programmed to: calculate for each active subscriber unit one or more priority factors as a function of associated power levels; and, for each of a succession of periods, allocate a channel to each of one or more active subscriber units, the allocation being based on one or more of said priority factors; and a flow controller, responsive to an output of said allocator and operative, with respect to each channel allocation, to retrieve from said buffer storage a corresponding amount of data and to send it to the transmitter, together with a corresponding channel designation.

22. The apparatus of claim 21, wherein said priority factors are calculated also as a function of the rate levels of channels allocated to the respective subscriber unit.

23. The apparatus of claim 21, wherein there is defined for the system a revenue function and wherein said digital processor is further programmed to calculate, for each active subscriber unit and for each rate level of channels allocated to it, a revenue value, based on the revenue function, and wherein said calculation of priority factors is also as a function of corresponding revenue values.

24. The apparatus of claim 21, wherein: the data for any subscriber unit, in the plurality of subscriber units are grouped as messages and there is a promised transmission rate (PTR) associated with each subscriber unit; said processor is further programmed to accumulate, for each active subscriber unit, the amount of data of a current message transmitted to it, to calculate therefrom an average transmission rate; and to calculate said priority factors also as a function of the PTR associated with the subscriber unit and of the average transmission rate for the subscriber unit.

25. The apparatus of claim 21, wherein a ratio between the rates at any two rate levels is an integral power of 2.

26. The apparatus of claim 21, wherein the data transmission system operates in CDMA mode and a channel is associated with a Walsh code.

27. The apparatus of claim 21, wherein the allocator is configured to allocate a channel to the subscriber unit that corresponds to the highest priority factor.

28. The apparatus of claim 21, wherein the transmission system is a cellular telephone system.

29. For use with a data transmission system for transmitting data from a transmitter to a plurality of subscriber units, wherein: fundamental channels (FCHs) are combined, in a hierarchical manner, into transmission channels of higher levels, each carrying data at a corresponding rate level, which is a correspondingly higher rate than the fundamental rate; any unused channel, at any level, is periodically allocated to a corresponding one of the subscriber units, in order to carry data to the subscriber unit from a buffer storage during a subsequent period; and a program storage device readable by machine, tangibly embodying a program of instructions executable by the machine to perform operations for periodically allocating channels to subscriber units, comprising, prior to the beginning of any period:

i. identifying all active subscriber units being in communication with the transmitter and for which there are data, exceeding a given minimal quantity, stored in the buffer storage;

ii. calculating for each active subscriber unit one or more priority factors as a function of associated power levels;

iii. on the basis of said priority factors, allocating at least one channel, to a corresponding active subscriber unit;

iv. repeating the channel allocation in respect of any active subscriber units to which no channels have yet been allocated, subject to an availability of unallocated channels and subject to a limitation of maximum transmitter power.

30. In a data transmission system for transmitting data from a transmitter to a plurality of subscriber units, wherein: fundamental channels (FCHs) are combined, in a hierarchical manner, into transmission channels of higher levels, each carrying data at a corresponding rate level, which is a correspondingly higher rate than the fundamental rate; any unused channel, at any level, is periodically allocated to a corresponding one of the subscriber units, in order to carry data to the subscriber unit from a buffer storage during a subsequent period; and a computer program product comprising a computer useable medium having computer readable program code embodied therein for periodically allocating channels to subscriber units, the computer program product comprising:

computer readable program code for causing the computer to identify prior to each period all active subscriber units being in communication with the transmitter and for which there are data, exceeding a given minimal quantity, stored in the buffer storage;

computer readable program code for causing the computer to calculate prior to each period for each active subscriber unit one or more priority factors as a function of associated power levels;

computer readable program code responsive to said priority factors for causing the computer to allocate prior to each period at least one channel, to a corresponding active subscriber unit; and computer readable program code for causing the computer to repeat the channel allocation in respect of any active subscriber units to which no channels have yet been allocated, subject to an availability of unallocated channels and subject to a limitation of maximum transmitter power.

* * * * *